(12) United States Patent
Minami

(10) Patent No.: US 7,143,476 B2
(45) Date of Patent: Dec. 5, 2006

(54) TILT HINGE

(75) Inventor: Toshifumi Minami, Kanagawa (JP)

(73) Assignee: Katoh Electrical Machinery Co., Ltd., Kanagawa (JP)

( * ) Notice: Subject to any disclaimer, the term of this patent is extended or adjusted under 35 U.S.C. 154(b) by 98 days.

(21) Appl. No.: 10/949,491

(22) Filed: Sep. 24, 2004

(65) Prior Publication Data
US 2005/0066475 A1    Mar. 31, 2005

(30) Foreign Application Priority Data
Sep. 29, 2003    (JP)    ............................. 2003-338851

(51) Int. Cl.
 *E05D 11/08*    (2006.01)
(52) U.S. Cl. .......................................... 16/340; 16/337
(58) Field of Classification Search ................. 16/342,
16/340, 337, 338; 348/794, 373, 333.06;
361/680–683; 248/917–923, 291.1, 292.12,
248/292.13
See application file for complete search history.

(56) References Cited

U.S. PATENT DOCUMENTS

| | | | | |
|---|---|---|---|---|
| 4,781,422 A * | 11/1988 | Kimble | ...................... | 361/680 |
| 5,109,570 A * | 5/1992 | Okada et al. | .................. | 16/289 |
| 6,081,969 A * | 7/2000 | Tanahashi et al. | ............ | 16/337 |
| 6,233,785 B1 * | 5/2001 | Tanahashi | ..................... | 16/337 |
| 6,301,748 B1 * | 10/2001 | Su-Man | ........................ | 16/342 |
| 6,421,878 B1 * | 7/2002 | Kaneko et al. | ................. | 16/330 |
| 6,467,129 B1 * | 10/2002 | Bae | .............................. | 16/342 |
| 6,530,123 B1 * | 3/2003 | Wahlstedt | .................... | 16/342 |
| 6,539,582 B1 * | 4/2003 | Chae | ............................ | 16/340 |
| 6,666,422 B1 * | 12/2003 | Lu et al. | ................... | 248/291.1 |
| 6,988,294 B1 * | 1/2006 | Birtley | ......................... | 16/342 |
| 2003/0221289 A1 * | 12/2003 | Lu | ............................... | 16/340 |

FOREIGN PATENT DOCUMENTS

| | | | | |
|---|---|---|---|---|
| JP | 10026126 A | * | 1/1998 |
| JP | 2000-501149 | | 2/2000 |
| JP | 2002005152 A | * | 1/2002 |
| JP | 2002364629 A | * | 12/2002 |
| JP | 2004116540 A | * | 4/2004 |
| JP | 2004169360 A | * | 6/2004 |

* cited by examiner

Primary Examiner—Chuck Y. Mah
(74) Attorney, Agent, or Firm—Notaro & Michalos P.C.

(57) ABSTRACT

In order to provide a tilt hinge small in size and diameter capable of generating a stable friction torque of approximately 100 kgf/mm, a hinge friction-rotatably coupling a first member and a second member that are relatively opened/closed includes: a holder attached to one of the first member and the second member; a shaft attached to the other one of the first member and the second member to be rotatable relative to the holder and immovable in an axial direction; a plurality of first friction discs restrained by the holder to be rotatable and movable in the axial direction, with the shaft being inserted through insertion holes thereof; a plurality of second friction discs interposed between the first friction discs to be movable in the axial direction with rotation thereof restrained by the shaft; and a plurality of disc springs and/or spring washers attached to the shaft so as to bring the first friction discs and the second friction discs to be in contact with each other by pressing the first friction discs and the second friction discs in the axial direction, wherein the disc springs and/or the spring washers are provided outside the holder in which the first friction discs and the second friction discs are stacked on each other and inside the holder.

19 Claims, 8 Drawing Sheets

TILT HINGE

BACKGROUND OF THE INVENTION

1. Field of the Invention

The present invention relates to a tilt hinge suitable for use in friction-rotatably coupling a keyboard main body being a first member and a display device being a second member of small OA equipment, for example, a laptop personal computer and a notebook personal computer.

2. Description of the Related Art

A laptop personal computer or a notebook personal computer is composed of a keyboard main body and a display device openably/closably attached to the keyboard main body via a tilt hinge. Such a personal computer is folded into two in not use while in use, the display device is opened for use relative to the keyboard main body. The thickness and size as small as possible are demanded for these computers, and accordingly, a tilt hinge with a small diameter and a high friction function is demanded. As a tilt hinge satisfying such demands, one described in Translated National Publication of Patent Application No. 2000-501149 is known.

A friction hinge described in this patent document is structured such that a plurality of clips in a washer shape each having a pair of arms, which are stacked in an axial direction are attached to a support means with rotation thereof being restrained, and a shaft is inserted between the respective arms to be in pressure contact with the arms, thereby generating a friction torque in a radial direction between an outer periphery of the shaft and the arms.

In the above-described friction hinge with a known structure, the pair of arms of each of the clips in a washer shape sandwich the shaft, thereby generating the friction torque. Therefore, it has a problem of a need for a large number of the clips in order to obtain a necessary friction torque with a small diameter because the friction area of each of the clips is small. In order to obtain a friction torque satisfying a development demand, for example, a friction torque of 100 kg/mm with a shaft with approximately 7 f, a larger number of the clips are required, which poses a problem of an increased axial dimension of the friction hinge.

SUMMARY OF THE INVENTION

It is an object of the present invention to provide a tilt hinge small in size and diameter capable of generating a necessary friction torque.

In order to achieve the object stated above, the present invention is a hinge friction-rotatably coupling a first member and a second member that are relatively opened/closed, and the hinge includes: a holder attached to one of the first member and the second member and having a disc housing portion; a shaft attached to the other one of the first member and the second member to be rotatable relative to the holder and immovable in an axial direction; a plurality of first friction discs housed in and restrained by the disc housing portion of the holder to be rotatable and movable in the axial direction with the shaft being inserted through insertion holes thereof; a plurality of second friction discs housed in the disc housing portion and interposed between the first friction discs to be movable in the axial direction with rotation thereof restrained by the shaft; and a resilient means attached to the shaft so as to bring the first friction discs and the second friction discs into contact with each other by pressing the first friction discs and the second friction discs in the axial direction.

This invention is further characterized in that the resilient means is constituted of a plurality of disc springs and/or spring washers attached to the shaft, and the disc springs and/or the spring washers are provided outside the holder in which the first friction discs and the second friction discs are stacked on each other and inside the holder.

In this invention, one of the first friction disc and the second friction disc can be made of a hard material and the other can be made of a soft material.

In this invention, each of the first friction discs can have at an outer periphery thereof a stopper portion caught in the holder, and each of the second friction discs can have, at an insertion hole thereof to which the shaft is inserted, a stopper portion caught by the shaft.

In this invention, the disc springs and/or the spring washers can be interposed between a nut attached to an end of the shaft and one of the first friction disc and the second friction disc, and between the first friction disc and the second friction disc, with the shaft being inserted through insertion holes thereof.

In this invention, out of the disc springs and/or the spring washers, the disc springs and/or the spring washers provided inside the holder can be disposed at several places between at least one pair of the first friction disc and the second friction, a plurality of pieces being provided at each place.

In this invention, a caulked portion formed by caulking the end of the shaft can be provided in place of the nut.

In this invention, the holder can have a case portion housing at least all or a part of the first friction discs and the second friction discs.

In this invention, each of the first friction discs and/or the second friction discs can have an oil pocket portion promoting lubrication of a portion where the first friction disc and the second friction disc are in pressure contact with each other.

With the above-described structures, the present invention can exhibit the following effects.

With the structures as in claims 1, 3, 4, 5 and 7, respective friction generating portions of the first friction discs and the second friction discs that are rotated in different directions in a pressure contact state are in surface contact with each other, so that the total friction area generating a friction torque is increased and a stronger friction torque is generated in each area between the first friction disc 2 and the second friction disc 3. This enables the generation of a friction torque even with a small diameter and size.

With the structure as in claim 2, the first friction discs made of the hard material and the second friction disc made of the soft material rotate and slide in opposite directions in pressure contact with each other, so that a stronger friction torque can be generated.

With the structure as in claim 6, it is possible to simplify the structure and thus cut down on production cost.

With the structure as in claim 8, it is possible to generate a stable friction torque without any occurrence of creaking or noises even after a long-term use.

DETAILED DESCRIPTION OF THE PREFERRED EMBODIMENTS

Hereinafter, an embodiment of the present invention applied to a notebook personal computer will be described, but the tilt hinge according to the present invention is applicable to other small electronic equipment such as a laptop personal computer and so on.

Figure 1:
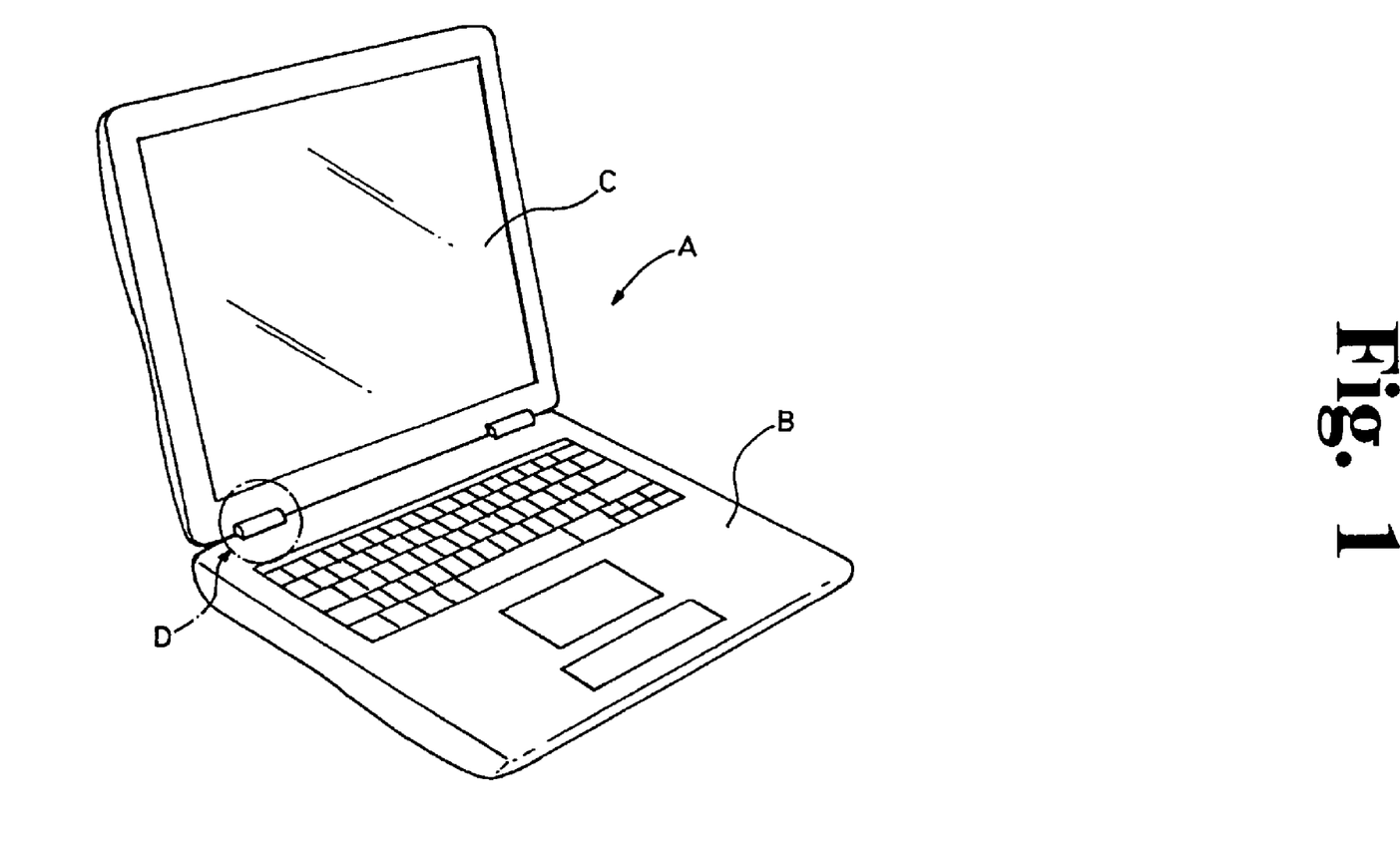
FIG. 1 is a perspective view of a notebook personal computer using a tilt hinge according to the present invention in an open state.
Figure 2:
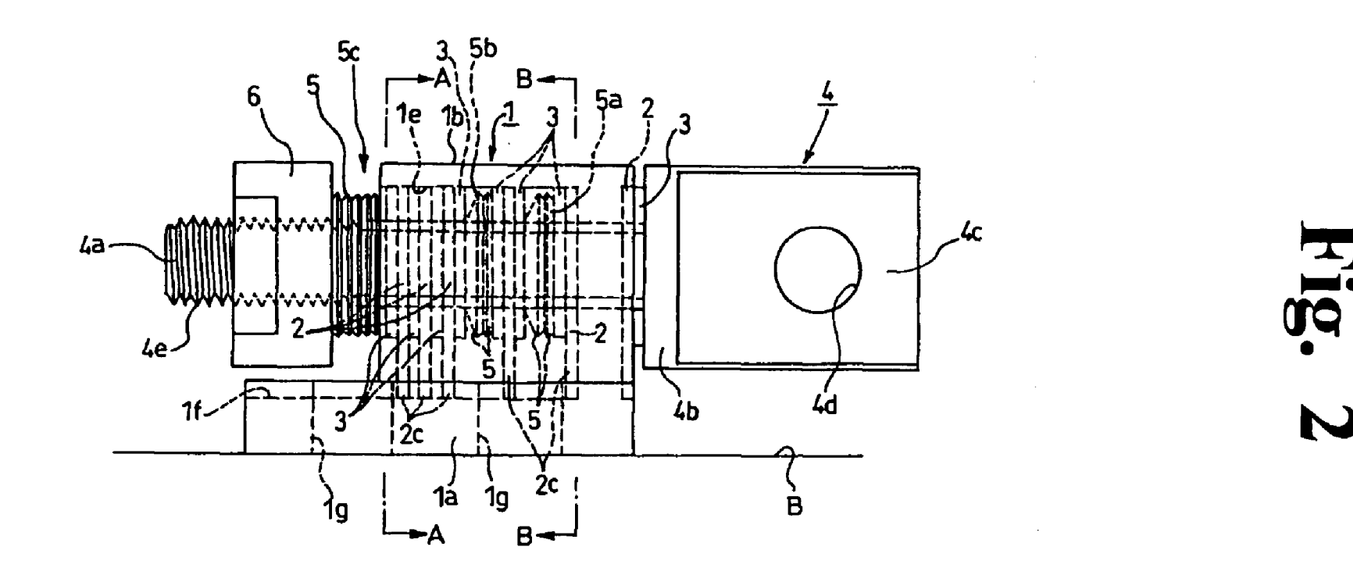
FIG. 2 is a front view of the tilt hinge according to the present invention.

According to the drawings, FIG. 1 shows a notebook personal computer A using the tilt hinge according to the present invention. The reference symbol B denotes a keyboard main body and the reference symbol C denotes a display device. The tilt hinge according to the present invention, which is attached to a portion D, relatively openably/closably couples the keyboard main body B and the display device C. Typically, two tilt hinges are used.

FIG. 2 to FIG. 5 show the structure of the tilt hinge according to the present invention. The reference numeral 1 denotes a holder attached to, for example, the keyboard main body B, which constitutes a first member, of the notebook personal computer A, and the holder 1 is composed of a mounting portion 1a and a case portion 1b. The case portion 1b has in one side portion thereof a side wall 1d having a bearing hole 1c and has a disc housing portion 1e housing later-described first friction discs 2 and second friction discs 3. The disc housing portion 1e has a catching groove 1f in which stopper portions 2c of the first friction discs 2 are caught. The mounting portion 1a has mounting holes 1g, 1g.

A deformed small-diameter portion 4a of a shaft 4 is rotatably supported by the bearing hole 1c provided in the side wall 1d of the holder 1. The shaft 4 has, next to the deformed small-diameter portion 4a, a flange portion 4b with a large diameter and a mounting portion 4c with a semicircular cross section. The display device C being the second member is to be attached to the mounting portion 4c as shown in FIG. 1 and FIG. 3 to FIG. 5. Incidentally, this mounting portion 4c may be attached to the keyboard main body B being the first member and the holder 1 may be attached to the display device C being the second member. The deformed small-diameter portion 4a of the shaft 4 has a substantially elliptical cross section with both sides thereof being cut off and has at a free end side thereof a female screw 4e. Further, the mounting portion 4c has a mounting hole 4d. Incidentally, the respective cross sectional shapes of the deformed small-diameter portion 4a and the mounting portion 4c are not limited to those in this embodiment. They can have various other cross sectional shapes such as a polygonal shape. Incidentally, the holder 1 may be attached to the display device C side and the shaft 4 maybe attached to the keyboard main body B side.

Figure 3:
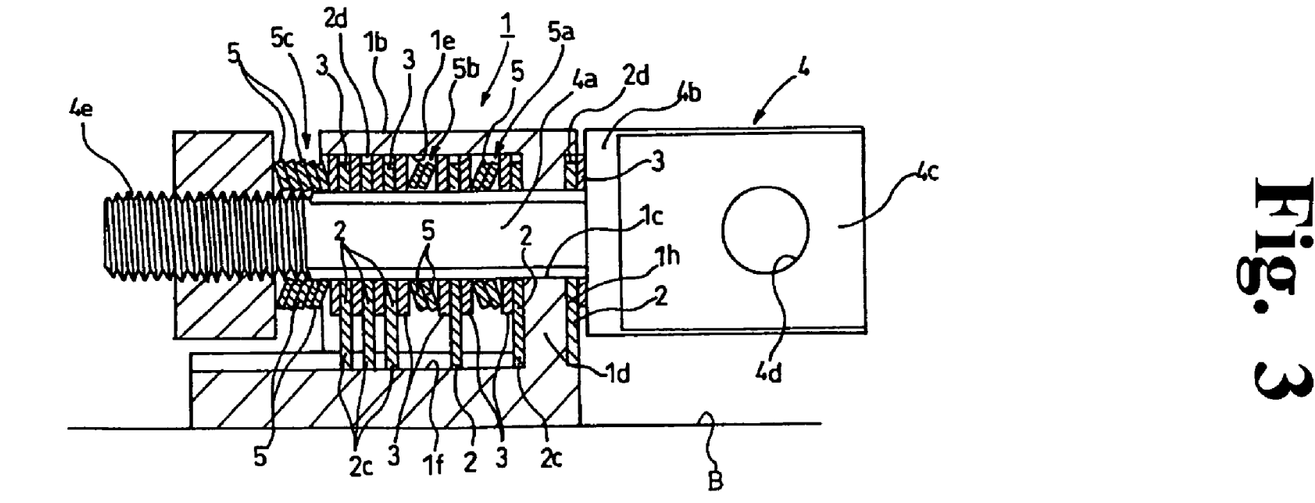
FIG. 3 is a vertical cross-sectional view of the tilt hinge in FIG. 2.
Figure 4:
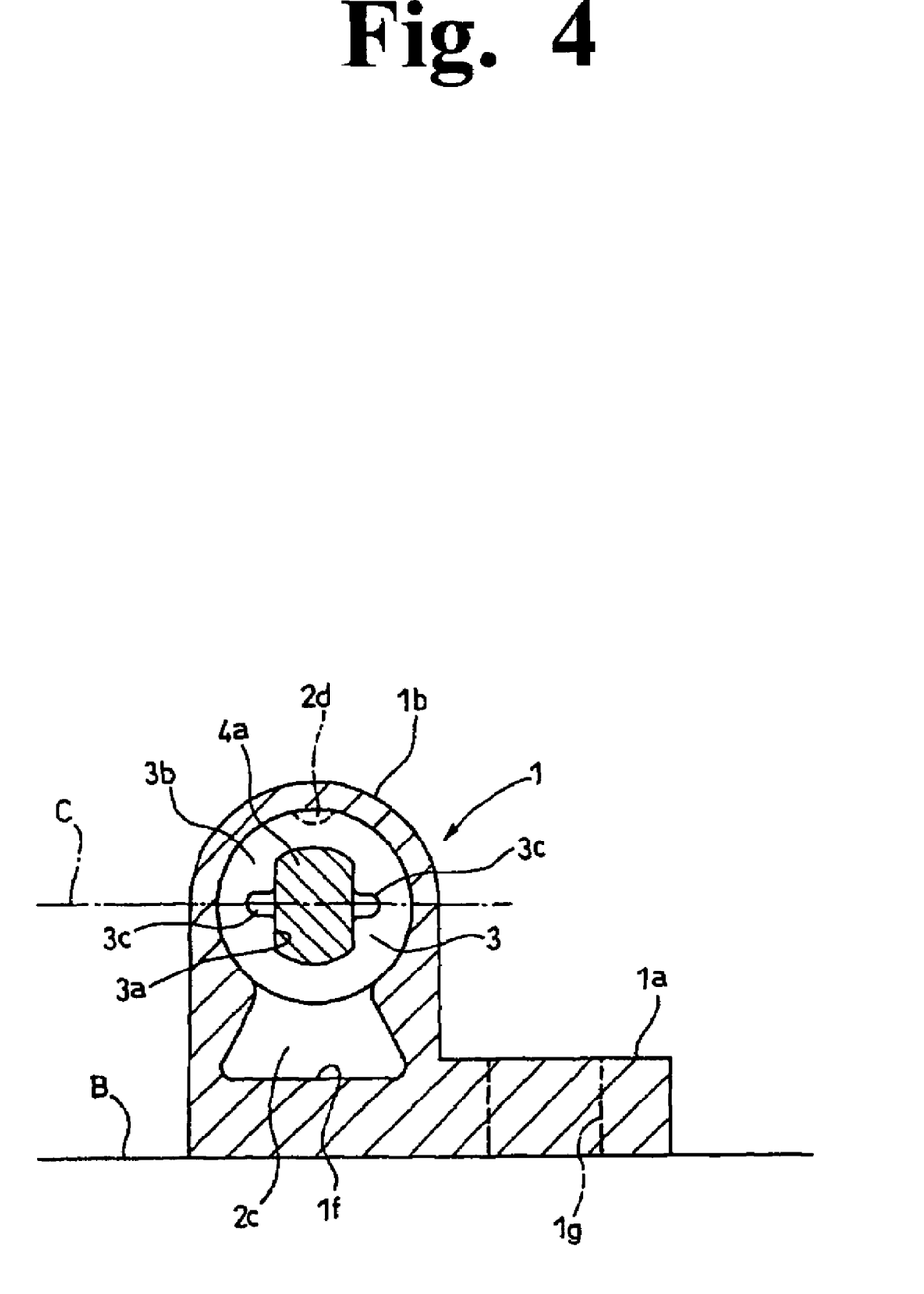
FIG. 4 is a cross-sectional view taken along the A—A line in FIG. 2.
Figure 5:
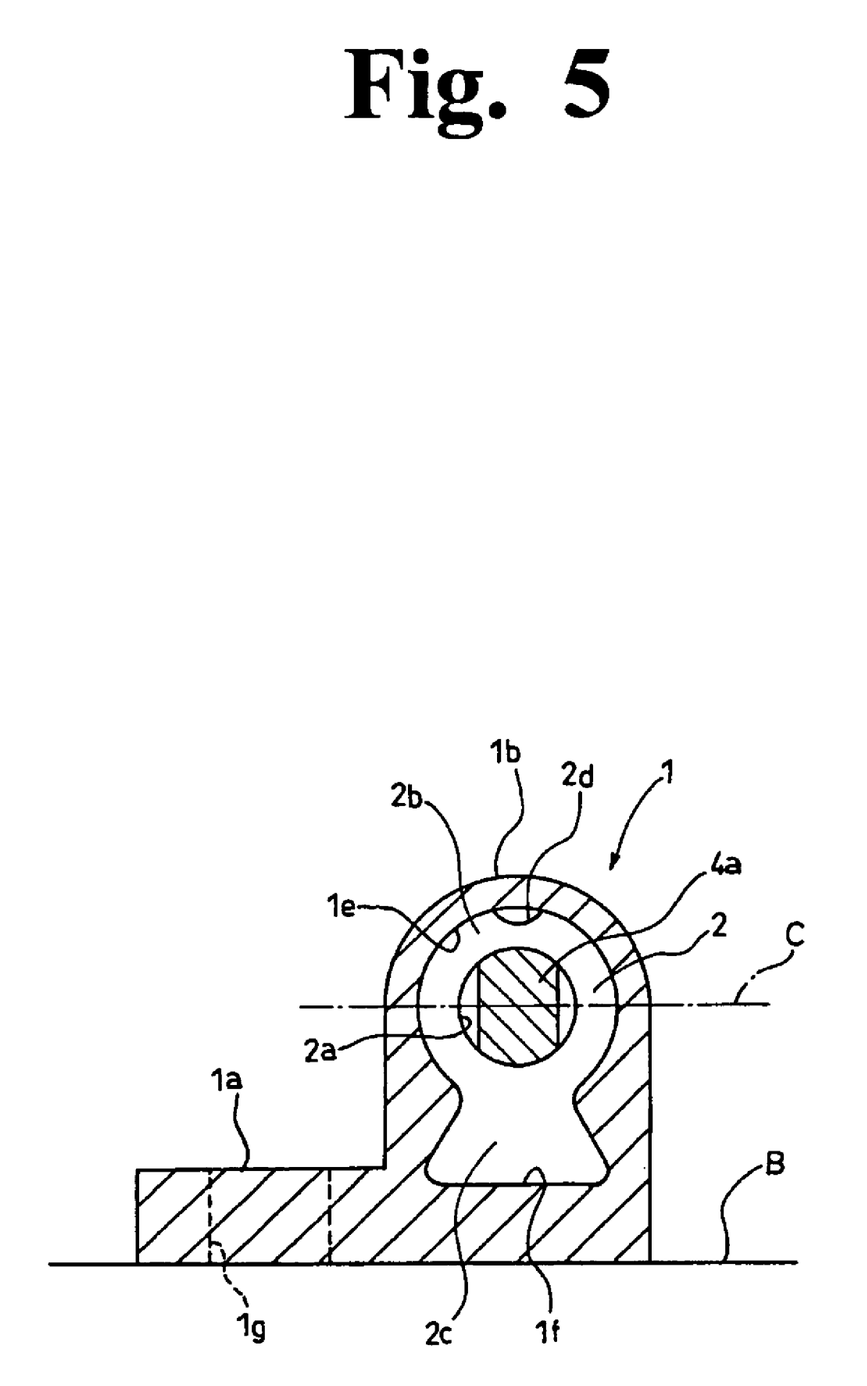
FIG. 5 is a cross-sectional view taken along the B—B line in FIG. 2.
Figure 6:
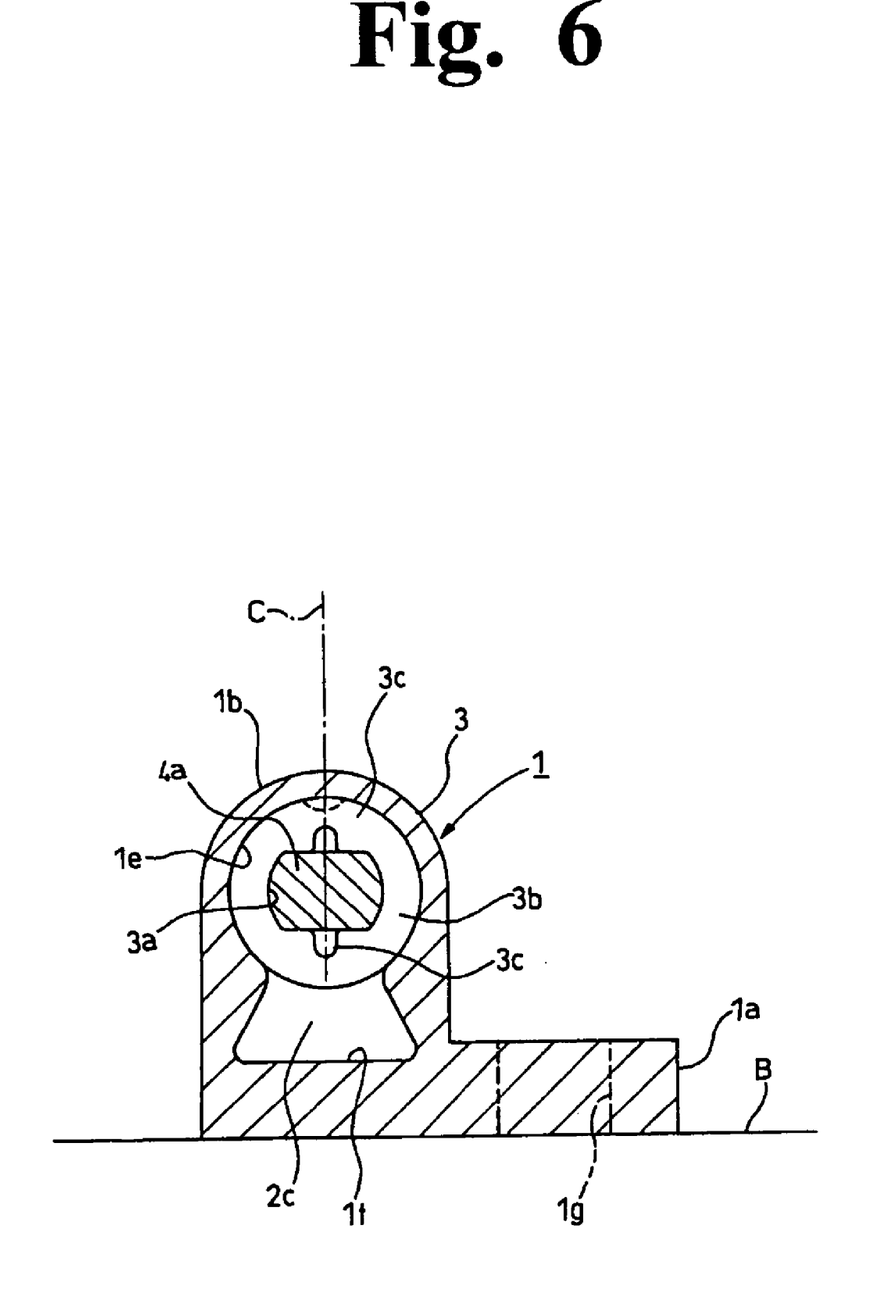
FIG. 6 is a cross-sectional view to explain an operation of the tilt hinge according to the present invention.
Figure 7:
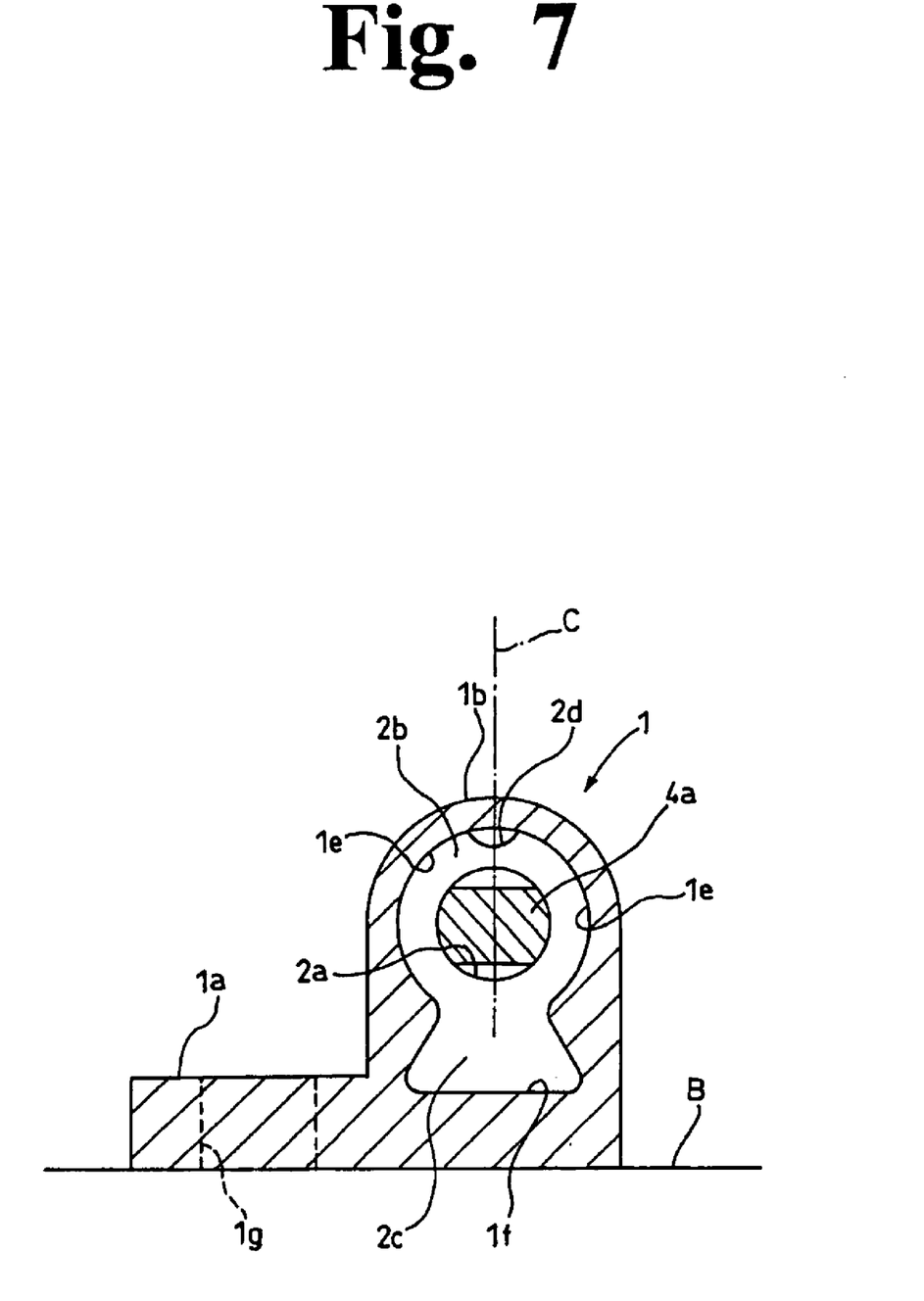
FIG. 7 is a cross-sectional view to explain an operation of the tilt hinge according to the present invention.

The first friction discs 2 are plate members each made of a hard metal material excellent in abrasion resistance and having a keyhole shape in a plane view. As shown in FIG. 5 in particular, the first friction disc 2 has a friction generating portion 2b and the stopper portion 2c. The friction generating portion 2b has a circular insertion hole 2a through which the deformed small-diameter portion 4a of the shaft 4 is inserted, and the stopper portion 2c protrudes from the friction generating portion 2b and has a substantially trapezoidal shape. Among the first friction discs 2, the plural pieces are housed in the disc housing portion 1e of the holder 1 and are restrained by the holder 1 with lower end portions of the stopper portions 2c thereof being caught in the catching groove 1f in the disc housing portion 1e, and one piece is caught and fixed in a recessed portion 1h provided outside the side wall 1d of the holder 1 as shown in FIG. 3 in particular. An oil pocket portion 2d formed by cutout is formed on an upper edge of each friction generating portion 2b. Incidentally, as for the position, number, and form of the oil pocket portion 2d in the first friction disc 2 are not limited to those in this embodiment. The oil pocket portion 2d can be provided on an inner periphery of the circular insertion hole 2a, and can be provided in the friction generating portion 2b as a small hole or a recessed portion.

The second friction discs 3 are also made of hard metal plate members excellent in abrasion resistance, each having a disc shape. Each of the second friction discs 3 includes a friction generating portion 3b having a deformed insertion hole 3a through which the deformed small-diameter portion 4a of the shaft 4 is inserted and an oil pocket portion 3c provided in the deformed insertion hole 3a thereof and formed of a pair of cutouts. Among these second friction discs 3, a plurality of pieces are disposed in the disc housing portion 1e, with both surfaces or one surface thereof being in contact with the first friction disc 2 and one piece is disposed between the flange portion 4b of the shaft 4 outside the holder 1 and the first friction disc 2.

The reference numeral 5 denotes a plurality of disc springs constituting a first resilient means 5a and a second resilient means 5b which are housed and arranged in the disc housing portion 1e of the holder 1 and a third resilient means 5c disposed outside the holder 1. Each of the disc springs 5 has at a center portion thereof a circular insertion hole 5d which extends in the axial direction and through which the deformed small-diameter portion 4a of the shaft 4 is inserted. Among the disc springs 5, two pieces constituting the first resilient means 5a are interposed between the second friction discs 3 that are disposed in the disc housing portion 1e of the case portion 1b of the holder 1 and that correspond to the second piece and the third piece from the right respectively, with the deformed small-diameter portion 4a of the shaft 4 being inserted through the respective insertion holes 5d thereof. Two pieces constituting the second resilient means 5b are interposed between the second friction discs 2 that correspond to the fifth piece and the sixth piece from the right, with the deformed small-diameter portion 4a of the shaft 4 being inserted through the respective insertion holes 5d thereof. Further, five disc springs constituting the third resilient means 5c are positioned outside the holder 1 and are interposed between the second friction disc 3 positioned at the outer most side in the disc housing portion 1e and a clamping nut 6 screwed to the female screw 4e provided in the deformed small-diameter portion 4a of the shaft 4, with the deformed small-diameter portion 4a of the shaft 4 being inserted through the respective insertion holes 5d thereof.

Therefore, when the clamping nut 6 is clamped, the first friction discs 2 and the second friction discs 3 disposed on both sides of the first resilient means 5a and the second resilient means 5b are brought into strong pressure contact with each other in the disc housing portion 1e by the first resilient means 5a and the second resilient means 5b, and in addition, the third resilient means 5c also brings the first friction discs 2 and the second friction discs 3, which are disposed between the third resilient means 5b and the second resilient means 5b, into strong pressure contact with each other. When the holder 1 or the shaft 4 is rotated in this state, a stronger friction torque is generated between the respective friction generating portions 2b, 3b of the first friction discs 2 and the second friction discs 3 than when only the third resilient means 5c acts since the first friction discs 2 and the third friction discs 3 disposed in the disc housing portion 1e are brought into stronger pressure contact with each other by the first resilient means 5a and the second resilient means 5b.

Next, a tilt hinge was structured, with the materials, dimensions, and so on of the above-described members being set as follows.

Specifically, as a constituting material of the holder 1, a 2DCI molded product was used, in which the case portion 1b was 7 mm in outer diameter, 7 mm in length, and 10 mm in height, the disc housing portion 1e was 5.4 mm in inner diameter, and the bearing hole 1c was 3 mm in diameter. As a material of the shaft 4, SUS303 was used in which the total length was 26. 8 mm, the flange portion 4b was 7 mm in outer diameter, and the small-diameter portion 4a was 3 mm in the maximum diameter. As the first friction disc 2, hardened SK-1 that was 0.4 mm in plate thickness and was nickel-plated on a surface thereof was used, in which its disc portion was 5.4 mm in outer diameter and the circular insertion hole 2b was 3 mm in inner diameter. As the second friction disc 3, hardened SK-1 that was 0.4 mm in plate thickness and was nickel-plated on a surface thereof was also used, in which its disc portion was 5.3 mm in outer diameter and the deformed insertion hole 3a was 3 mm in major axis. Further, as a material of the disc spring 5, steel for a spring that was 0.3 mm in plate thickness and was coated with phosphate on a surface thereof was used, in which its disc portion was 5 mm in outer diameter, the insertion hole 5d was 3 mm in inner diameter, and the total thickness was 0.67 mm. As the clamping nut 6, SUM24L surface-treated with MF2n3 was used. Further, as a lubricant, fluorine grease, for example, SMITECH P1 and the like, was used and it was applied between each of the first friction disc 2 and each of the second friction disc 3.

Using the respective members as structured above, proof tests were conducted 30,000 times in such a manner that the first friction discs 2, the second fiction discs 3, and the disc springs 5 were arranged as shown in FIG. 3, the clamping nut 6 was clamped until an initial friction torque reached 100 kgf/mm, and the holder 1 and the shaft 4 were rotated relatively in opposite directions. As a result of measuring friction torques, only a slight change over time was observed even after the proof tests and a friction torque was maintained at approximately 100 kgf/mm. Incidentally, when a proof test was conducted using nickel-plated phosphor bronze H-plate as the first friction discs 2, substantial torque down was observed at an initial stage, but thereafter, it was possible to generate a stable friction torque.

Further, when the measurement was conducted using hardened SUS304 nickel-plated on a surface thereof as the first friction discs, only slight torque down was observed at an initial stage, and it was possible to generate a stable friction torque in a range of 80 kg/mm.

Figure 8:
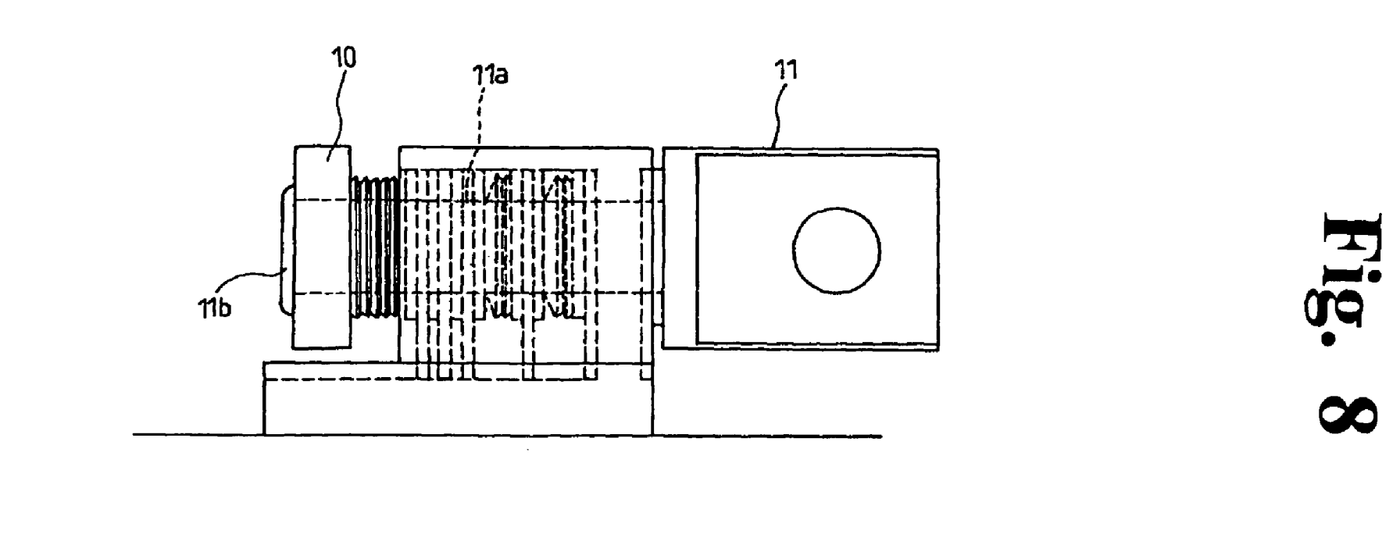
FIG. 8 is a front view showing another embodiment of the tilt hinge according to the present invention.

FIG. 8 shows another embodiment, in which a retaining washer 10 and a caulked portion 11b of a deformed small-diameter portion 11a of a shaft 11 are used in place of the clamping nut in the above-described embodiment.

When such a structure is applied, it is also possible to achieve the object of the present invention, and in addition, since a simplified structure is realized, production cost can be curtailed.

Incidentally, in the embodiments described above, the structure and shape of the first friction discs and the second friction discs, how they should be combined, whether hard materials should be used for all of them, whether hard ones and soft ones should be alternately used, and so on are not limited, except that at least two pieces of the respective discs should be stacked. Further, spring washers may be used in place of the disc springs. In addition, a lubricant oil is basically used, but it is also conceivable that surfaces of the washers are fluorine-coated or nitrided without using the lubricating oil.

What is claimed is:

1. A tilt hinge friction-rotatably coupling a first member and a second member that are relatively opened or closed, the hinge comprising:
   a holder attached to one of the first member and the second member and having a disc housing portion;
   a shaft attached to the other one of the first member and the second member to be rotatable relative to the holder and immovable in an axial direction;
   a plurality of first friction discs housed in and restrained by the disc housing portion of the holder, each of the first friction discs having a central insertion hole through which the shaft passes;
   a plurality of second friction discs housed in the disc housing portion and interposed between the first friction discs, the second friction discs being mounted on the shaft and rotatable with the shaft; and
   a resilient means mounted on the shaft to urge the first friction discs and the second friction discs into contact with each other,
   wherein one portion of the resilient means is disposed between a fastening means attached to an end of the shaft and one of the first friction discs and the second friction discs, and
   wherein at least one other portion of the resilient means is disposed between any one or combination of: the first and second friction discs, two first friction discs, and two second friction discs, within the disc housing portion.

2. The tilt hinge according to claim 1, wherein the resilient means comprises
   a plurality of disc springs and/or spring washers.

3. The tilt hinge according to claim 2, wherein the disc springs and/or the spring washers of the other portion of the resilient means are disposed within the holder and wherein at least one said disc springs and/or the spring washers is provided between at least one pair of the first and second friction discs.

4. The tilt hinge according to claim 2, wherein one or more disc springs and/or spring washers of the resilient means are provided outside the disc housing portion.

5. The tilt hinge according to claim 1, wherein one of the first friction discs and the second friction discs is made of a suitable material of a lower hardness value than the other.

6. The tilt hinge according to claim 1, wherein each of the first friction discs has at an outer periphery a stopper portion that engages a catching groove of the disc housing portion.

7. The tilt hinge according to claim 1, wherein the fastening means is formed by caulking one end of the shaft.

8. The tilt hinge according to claim 1, wherein at least one of the first friction discs or the second friction discs comprises an oil pocket portion for lubricating a contact portion where the first and second friction discs are in contact with each other.

9. A tilt hinge for connecting a first member and a second member which are opened and closed with respect to each other in a manner to be friction-rotatable, the tilt hinge comprising:
- a holder comprising a mounting portion, a case portion having a disk housing portion with a catching groove, and a side wall with a bearing hole mounted on one side of the disk housing portion, the bearing hole having the same axis as the disk housing portion;
- a shaft comprising a deformed small-diameter portion, a flange portion, and a mounting portion, the shaft being rotatably mounted on the bearing hole with the small diameter portion penetrating in an axial direction through the disk housing portion, the mounting portion of the shaft being attached to one of the first and second member;
- a plurality of first friction disks with stopper portions, the first friction disks being mounted on the small-diameter portion of the shaft in an axial direction through a circular insertion hole of each one of the first friction disks, the first friction disks being held by the disk housing portion, the stopper portions engaging the catching groove;
- a plurality of second friction disks having deformed insertion holes in the central axial direction, the second friction disks being mounted on the small-diameter portion of the shaft through the deformed insertion holes of each one of the second friction disks and interposed between the first friction disks, and the second friction disks being disposed in the disk housing portion and rotatable along with the shaft;
- an elastic means comprising disc springs and/or spring washers provided on the shaft for press-contacting with each other the first friction disks and the second friction disks, the disc springs and/or spring washers each having mounting holes for receiving the deformed small-diameter portion of the shaft;
- a fastening means attached on an end of the shaft to place the elastic means under a desired load;
- wherein a portion of the disc springs and/or the spring washers is disposed between the fastening means and one of the first friction discs and second friction discs, and wherein at least one other portion of the disc springs and/or the spring washers is disposed between any one or combination of: the first and second friction discs, two first friction discs, and two second friction disks, within the disk housing portion.

10. The tilt hinge according to claim 9, wherein the disk housing portion comprises at least one pair of the first and second friction discs, each pair comprising either one of the first friction discs flanked by two second friction discs, with one on each side, or one of the second friction discs flanked by two first friction discs, with one on each side.

11. The tilt hinge according to claim 10, wherein two or more disc springs or spring washers are provided between each pair of the first and second friction discs.

12. The tilt hinge according to claim 10, wherein one or more disc springs and/or spring washers are provided outside the disk housing portion.

13. The tilt hinge according to claim 9, wherein one of the first friction discs and second friction discs is made of a suitable material that has a lower hardness value than the other.

14. The tilt hinge according to claim 13, wherein the material with the lower hardness value is nickel-plated phosphor bronze H-plate.

15. The tilt hinge according to claim 9, wherein the fastening means comprises a clamping nut adapted to fit a male screw portion of the shaft.

16. The tilt hinge according to claim 9, wherein the fastening means is formed by caulking one end of the shaft.

17. The tilt hinge according to anyone of claim 9, wherein at least one of the first friction discs comprises an oil pocket portion formed on an upper edge.

18. The tilt hinge according to anyone of claim 9, wherein at least one of the second friction discs comprises an oil pocket portion formed about the deformed insertion hole.

19. The tilt hinge according to anyone of claim 9, further comprising one of the first friction discs attached to the side wall of the case portion and one of the second friction discs attached to the flange portion of the shaft.

* * * * *